(12) United States Patent
Harada (10) Patent No.: US 8,744,984 B2
(45) Date of Patent: Jun. 3, 2014

(54) INFORMATION TERMINAL AND CONTROL METHOD THAT STORES IMAGE TIME SERIES DATA RELATED TO SALES OF COMMODITIES ALONG WITH SALES TOTALS

(71) Applicant: Toshiba Tec Kabushiki Kaisha, Tokyo (JP)

(72) Inventor: Yukio Harada, Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/869,222

(22) Filed: Apr. 24, 2013

(65) Prior Publication Data

US 2013/0279876 A1 Oct. 24, 2013

Related U.S. Application Data

(63) Continuation of application No. 13/020,050, filed on Feb. 3, 2011, now Pat. No. 8,447,709.

(30) Foreign Application Priority Data

Feb. 5, 2010 (JP) ................................. 2010-024528

(51) Int. Cl.
*G06F 15/18* (2006.01)
(52) U.S. Cl.
USPC ................................ 706/12; 705/22; 348/135
(58) Field of Classification Search
USPC ............ 706/12, 45, 62; 348/135, 143; 705/16, 705/22, 28, 29
See application file for complete search history.

(56) References Cited

U.S. PATENT DOCUMENTS

| 7,304,662 | B1 * | 12/2007 | Sullivan et al. ............... 348/150 |
| 7,792,256 | B1 | 9/2010 | Arledge et al. |
| 7,987,125 | B2 | 7/2011 | Roberts |

(Continued)

FOREIGN PATENT DOCUMENTS

| JP | 08-161647 | 6/1996 |
| JP | 2001-209863 | 8/2001 |

(Continued)

OTHER PUBLICATIONS

Japanese Office Action for Japanese Application No. 2010-024528 mailed on Nov. 29, 2011.

(Continued)

*Primary Examiner* — David Vincent
(74) *Attorney, Agent, or Firm* — Amin, Turocy & Watson, LLP (57) ABSTRACT

According to one embodiment, an information terminal includes a storing unit configured to store image pickup data picked up in time series by an image pickup apparatus that picks up images of a sales floor and sales data obtained by recording sales of a commodity displayed in the sales floor and date and time of registration of the sales; a list display unit configured to list-display videos of a predetermined sales floor in time series at every predetermined time interval on the basis of the image pickup data; a totalizing unit configured to totalize, at the every time interval, list-displayed sales of the commodity of the sales floor on the basis of the sales data; and a sales display unit configured to display the totalized sales of the commodity at the every time interval.

10 Claims, 7 Drawing Sheets

(56) References Cited

U.S. PATENT DOCUMENTS

| | | |
|---|---|---|
| 2002/0019885 A1* | 2/2002 | Sleeper .................... 709/318 |
| 2002/0075312 A1* | 6/2002 | Amadio et al. ............. 345/764 |
| 2005/0055223 A1* | 3/2005 | Khosla ............................ 705/1 |
| 2007/0083449 A1 | 4/2007 | Roberts |
| 2007/0268121 A1* | 11/2007 | Vasefi et al. ................ 340/506 |
| 2007/0295560 A1 | 12/2007 | Heckel et al. |
| 2008/0015944 A1 | 1/2008 | Nose et al. |
| 2008/0115066 A1* | 5/2008 | Pavley et al. ................ 715/747 |
| 2010/0002082 A1* | 1/2010 | Buehler et al. .............. 348/159 |
| 2010/0138037 A1 | 6/2010 | Adelberg et al. |
| 2010/0281380 A1* | 11/2010 | Langmacher et al. ........ 715/723 |
| 2011/0138335 A1* | 6/2011 | Zacariah et al. ............. 715/843 |
| 2011/0143779 A1 | 6/2011 | Rowe et al. |

FOREIGN PATENT DOCUMENTS

| | | |
|---|---|---|
| JP | 2002-024514 | 1/2002 |
| JP | 2004-118453 | 4/2004 |
| JP | 2005-286619 | 10/2005 |
| JP | 2006-293966 | 10/2006 |
| JP | 2010-020666 | 1/2010 |

OTHER PUBLICATIONS

U.S. Office Action mailed on Sep. 24, 2012 corresponding to U.S. Appl. No. 13/020,050, filed Feb. 3, 2011.

\* cited by examiner

| COMMODITY CODE | COMMODITY NAME | UNIT PRICE | COMMODITY CLASSIFICATION CODE |
|---|---|---|---|

| TRANSACTION NUMBER | TRANSACTION TYPE | SALES DATA | DATE AND TIME |
|---|---|---|---|

1_20100125_1030.jpg
1_20100125_1100.jpg
1_20100125_1130.jpg

⋮

2_20100125_1030.jpg
2_20100125_1100.jpg
2_20100125_1130.jpg

⋮

INFORMATION TERMINAL AND CONTROL METHOD THAT STORES IMAGE TIME SERIES DATA RELATED TO SALES OF COMMODITIES ALONG WITH SALES TOTALS

CROSS-REFERENCE TO RELATED APPLICATION

This application is a Continuation of application Ser. No. 13/020,050 filed on Feb. 3, 2011; the entire contents of which are incorporated herein by reference.

This application is based upon and claims the benefit of priority from the prior Japanese Patent Application No. 2010-024528, filed on Feb. 5, 2010; the entire contents of which are incorporated herein by reference.

FIELD

Embodiments described herein relate generally to an information terminal and a control method.

BACKGROUND

In the past, in a store such as a supermarket or a convenience store, a store clerk supplies commodities to display shelves on the basis of data of a point of sale (POS) system. In the POS system, a POS terminal generates sales data of settlement target commodities. An information processing apparatus such as a store computer subjects the sales data to registration processing. The display shelves, the POS terminal, and the store computer are provided in areas apart from one another in the store.

A user operates the store computer, checks the transition of sales of commodities and determines necessity of supply of the commodities to the display shelves and timing for the supply. The user predicts future sales of the commodities from the transition of the sales of the commodities. However, since the user does not grasp, for example, actual states of the display shelves, the user cannot supply commodities according to an actual situation of a sales floor.

Therefore, there is a system that picks up images of the same sales floor with cameras set in the sales floor at a time interval and detects time-series differences among the images as degrees of decrease in commodities (see JP-A-2002-24514). However, in this system, a user cannot check the transition of sales of commodities that decrease in the sales floor. It is not easy for the store clerk to check an actual situation of the sales floor in each hour such as the number of commodities displayed on displays shelves in the sales floor. To accurately predict future sales of commodities, the user needs to grasp, for example, flows of customers moving around the store holding commodities without making a payment. However, an actual situation of the sales floor in each hour and the transition of sales from sales data cannot be compared. Therefore, it is not easy to grasp, for example, the flows of customers.

DETAILED DESCRIPTION

In general, according to one embodiment, an information terminal includes: a storing unit configured to store image pickup data picked up in time series by an image pickup apparatus that picks up images of a sales floor and sales data obtained by recording sales of a commodity displayed in the sales floor and date and time of registration of the sales; a list display unit configured to list-display videos of a predetermined sales floor in time series at every predetermined time interval on the basis of the image pickup data; a totalizing unit configured to totalize, at the every time interval, list-displayed sales of the commodity of the sales floor on the basis of the sales data; and a sales display unit configured to display the totalized sales of the commodity at the every time interval.

According to another embodiment, a control method for an information terminal including: a storing unit configured to store image pickup data picked up in time series by an image pickup apparatus that picks up images of a sales floor and sales data obtained by recording sales of a commodity displayed in the sales floor and date and time of registration of the sales; and a display unit includes: list-displaying videos of a predetermined sales floor in time series at every predetermined time interval on the basis of the image pickup data; totalizing, at the every time interval, list-displayed sales of the commodity of the sales floor on the basis of the sales data; and displaying the totalized sales of the commodity at the every time interval.

Exemplary embodiments of an information terminal and a control method will be explained below in detail with reference to the accompanying drawings.

Figure 1:
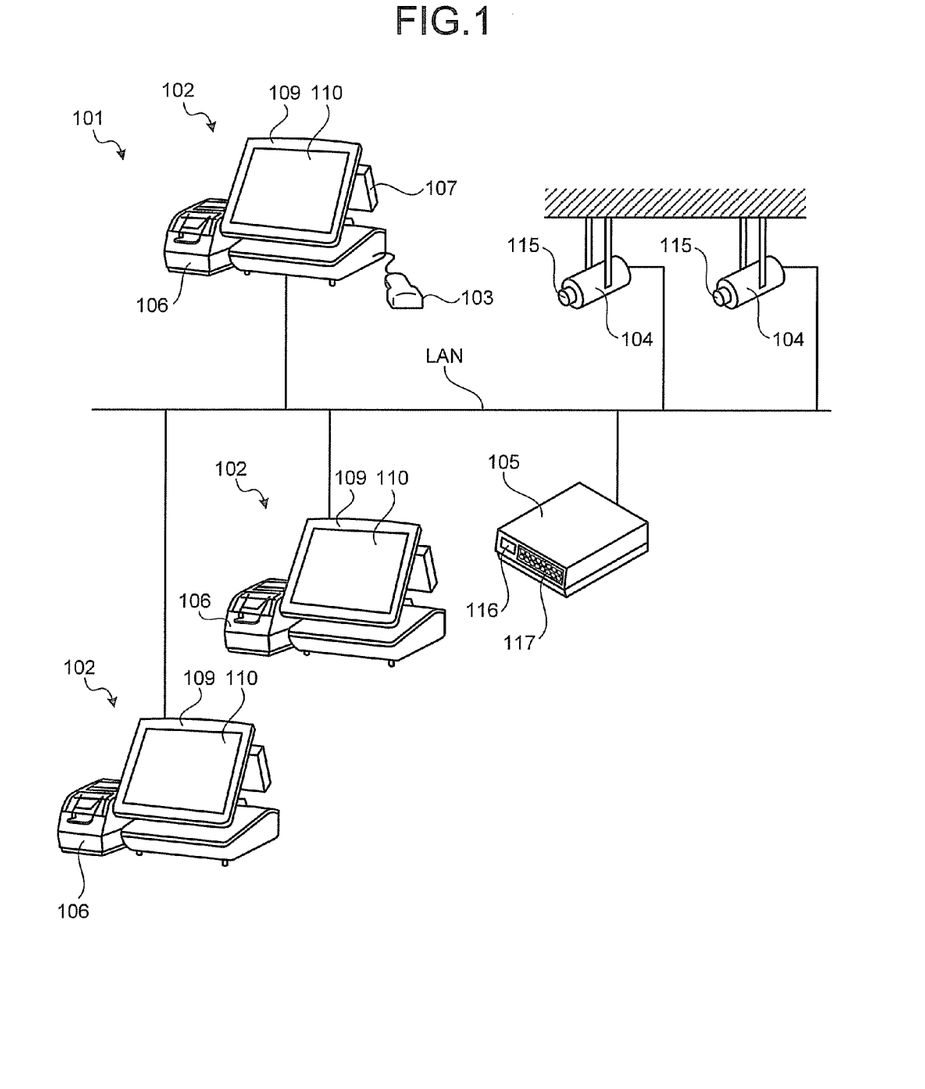
FIG. 1 is a schematic system diagram of the entire configuration of a POS system.

FIG. 1 is a schematic system diagram of the entire configuration of a POS system 101. The POS system 101 shown in FIG. 1 includes information terminals 102 set in a register table, a backyard of a store, and the like, live cameras 104 configured to pick up images of a space of a not-shown sales floor, and a store computer 105 as a server configured to control the entire POS system 101. In the POS system 101, the information terminals 102, the live cameras 104, and the store computer 105 are connected by a local area network (LAN) or the like to be capable of communicating with one another.

The information terminals 102 are a point of sale (POS) terminal set on the register table or the like and an information apparatus set in the backyard or the like and used for performing sales floor management processing such as check of stocks and sales of commodities. The information terminals 102 have the same basic structure and functions irrespective of whether the information terminals 102 are set on the register table or the like or in the backyard. The information terminals 102 are different only in forms of use thereof. Specifically, the information terminal 102 as the POS terminal set on the register table or the like performs sales registration processing including checkout of sold commodities and registration of the sold commodities other than the sales floor management processing such as the check of stocks and sales of commodities. Therefore, the information terminal 102 includes a printer 106 configured to print a receipt and information concerning, for example, stocks and sales of commodities, a liquid crystal display 109 for displaying various kinds of information, and a touch panel 110 configured to receive operation by a user. The information terminal 102 as the POS terminal set on the register table or the like also includes, in addition to the components explained above, a scanner apparatus 103 for optically reading barcodes and two-dimensional codes attached to commodities sold in the store and a customer-side display apparatus 107 for displaying, on the register table, checkout content to a customer.

Figure 2:
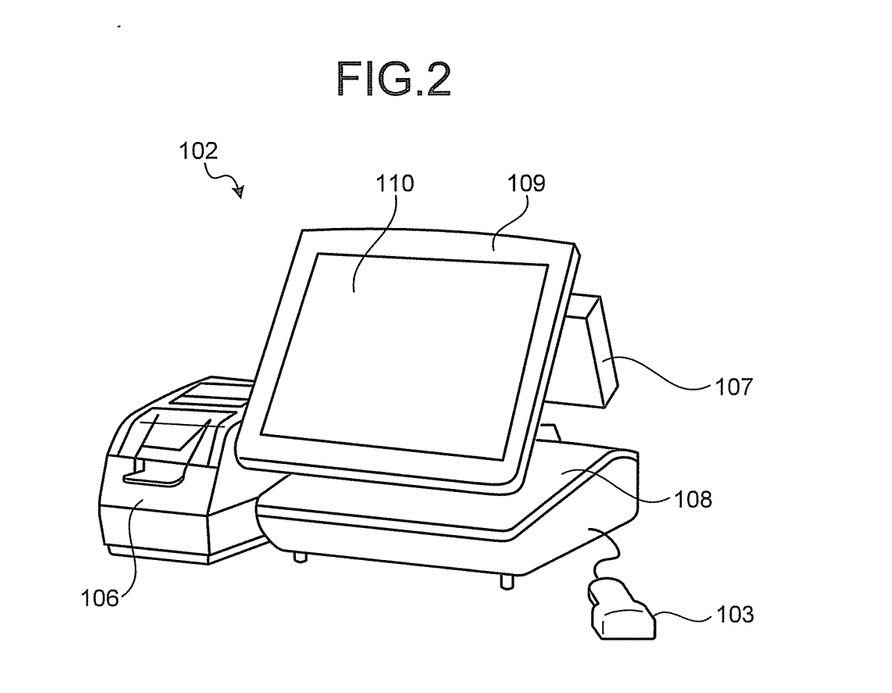
FIG. 2 is a perspective view of an external form of an information terminal viewed from the front surface side thereof.

FIG. 2 is a perspective view of an external form of the information terminal 102 functioning as the POS terminal viewed from the front surface side thereof. In the information terminal 102, the liquid crystal display 109 as a display device is placed on the upper surface of a main body unit 108. In the liquid crystal display 109, the touch panel 110 as an input device is laminated and arranged on a display surface of the liquid crystal display 109. The printer 106 is set adjacent to, for example, the vicinity of the information terminal 102. The printer 106 and the scanner apparatus 103 are connected to the information terminal 102 via an interface such as a universal serial bus (USB).

Figure 3:
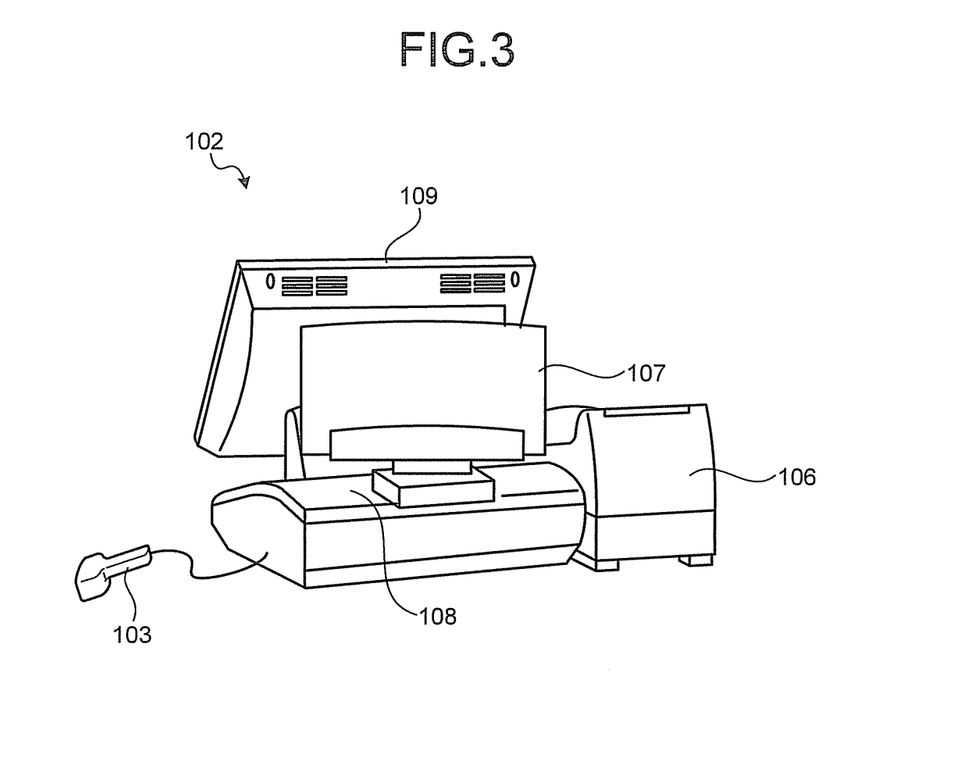
FIG. 3 is a perspective view of an external form of the information terminal viewed from the rear surface side thereof.

FIG. 3 is a perspective view of an external form of the information terminal 102 functioning as the POS terminal viewed from the rear surface side thereof. In FIG. 3, the customer-side display apparatus 107 is clearly shown. As an example, the customer-side display apparatus 107 is a light emitting diode (LED) display apparatus configured to display seven segments. The customer-side display apparatus 107 is set to be placed on the upper surface of the main body unit 108 of the information terminal 102. Like the printer 106 and the scanner apparatus 103, the customer-side display apparatus 107 is also connected to the information terminal 102 via an interface such as a USB.

As shown in FIG. 1, the live cameras 104 focus images captured from lenses 115 on, for example, two-dimensional CCD arrays (not shown). The live cameras 104 are image pickup apparatuses configured to subject outputs of the two-dimensional CCD arrays to amplification, A/D conversion, filtering, or the like and output the outputs as moving images. The live cameras 104 are set in each sales floor in the store and distribute videos of display shelves and the like in detail as moving images. Network addresses (e.g., IP addresses or MAC addresses), which are unique on the LAN, are set for the live cameras 104 set in each sales floor. Therefore, the information terminals 102 and the store computer 105 can acquire videos distributed from the live cameras 104 in a predetermined sales floor by designating the network addresses.

The store computer 105 includes a small liquid crystal display 116 and a keyboard 117. The store computer 105 performs management of various kinds of information transmitted from the information terminals 102 and management of moving images in each sales floor distributed from the live cameras 104.

Figure 4:
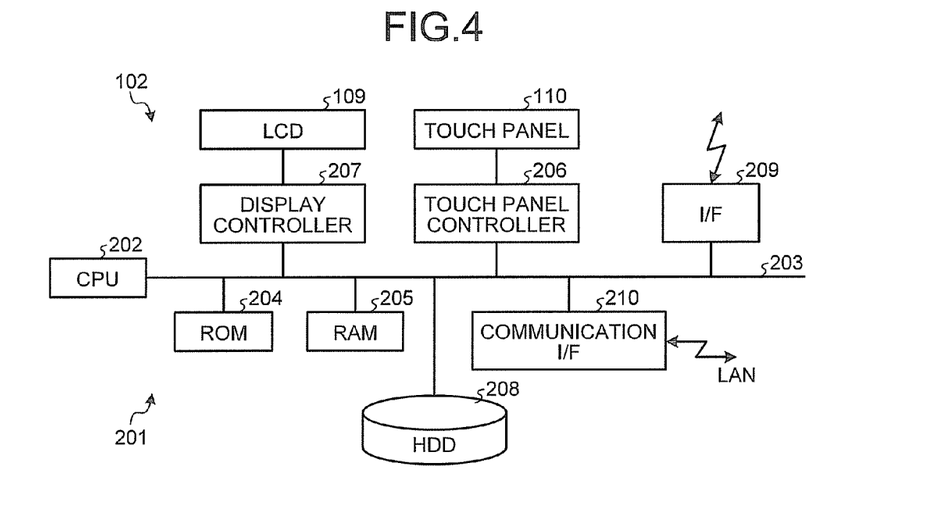
FIG. 4 is a block diagram of electric connection of the information terminal.

FIG. 4 is a block diagram of electric connection of the information terminal 102. As shown in FIG. 4, the information terminal 102 includes a microcomputer 201. The microcomputer 201 controls driving of units of the information terminal 102. In the microcomputer 201, a read only memory (ROM) 204 having stored therein fixed information such as a program for control in advance and a random access memory (RAM) 205 configured to rewritably store various kinds of information and functioning as a work area or the like are connected to, via a bus line 203, a central processing unit (CPU) 202 configured to centrally control the units.

A touch panel controller 206, a display controller 207, a hard disk drive (HDD) 208, an interface 209, and a communication interface 210 are connected to the microcomputer 201 via the bus line 203. The touch panel controller 206 captures an input signal from the touch panel 110 into the microcomputer 201. The display controller 207 controls driving of the liquid crystal display 109 on the basis of image data and causes the liquid crystal display 109 to display an image corresponding to the image data. The interface 209 is an interface for connecting the scanner apparatus 103, the printer 106, the customer-side display apparatus 107, and the like to the microcomputer 201. The interface 209 includes a USB as explained above. The communication interface 210 is an interface for enabling the microcomputer 201 to perform data communication with other apparatuses via the LAN.

The HDD 208 has stored therein an operating system (OS), computer programs (hereinafter, programs), various files, and the like. All or a part of the OS, the programs, the various files, and the like are copied to the RAM 205 during the start of the information terminal 102 and accessed by the CPU 202. The CPU 202 executes processing (e.g., sales registration processing or sales floor management processing) conforming to the OS and the programs copied in this way.

Figure 5:
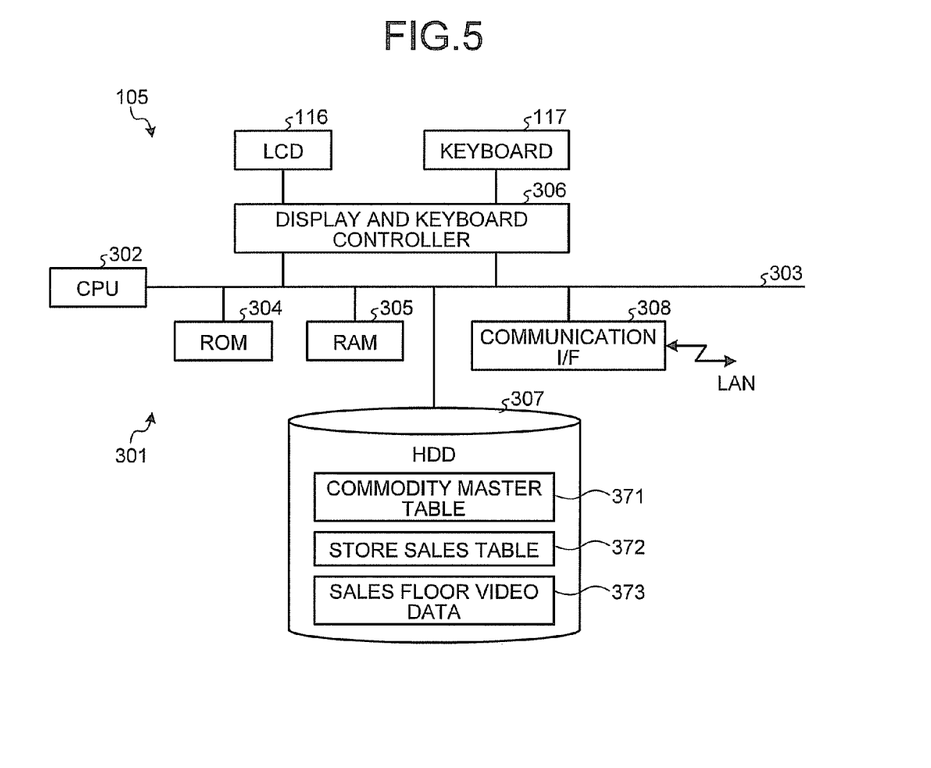
FIG. 5 is a block diagram of electric connection of a store computer.

FIG. 5 is a block diagram of electric connection of the store computer 105. As shown in FIG. 5, the store computer 105 includes a microcomputer 301. The microcomputer 301 controls driving of units of the store computer 105. In the microcomputer 301, a ROM 304 having stored therein fixed information such as a program for control in advance and a RAM 305 configured to rewritably store various kinds of information and functioning as a work area or the like are connected to, via a bus line 303, a CPU 302 configured to centrally control the units.

A display and keyboard controller 306, a HDD 307, a communication interface 308 are connected to the microcomputer 301 via the bus line 303. The display and keyboard controller 306 controls driving of the liquid crystal display 116 on the basis of image data and causes the liquid crystal display 116 to display an image corresponding to image data. The printer 106 captures an input signal from the keyboard 117 into the microcomputer 301. The communication interface 308 is an interface for enabling the microcomputer 301 to perform data communication with other apparatuses through the LAN.

The HDD 307 has stored therein an OS, programs, various files, and the like. All or a part of the OS, the programs, the various files, and the like are copied to the RAM 305 during the start of the store computer 105 and accessed by the CPU 302. The CPU 302 executes processing conforming to the OS and the programs copied in this way.

The various files stored by the HDD 307 include a commodity master table 371, a store sales table 372, and a sales floor video data 373. In the commodity master table 371, data concerning commodities sold in the store is stored. The commodity master table 371 is data set in advance by setting processing by the information terminal 102 or the like. The commodity master table 371 is referred to when sales registration processing is performed in the information terminal 102 as the POS terminal. The store sales table 372 stores data concerning sales of the store. In the store sales table 372, the data concerning sales is updated when the information terminal 102 as the POS terminal performs the sales registration processing. In the sales floor video data 373 as image pickup data, videos of sales floors distributed from the live cameras 104 set in each sales floor are stored for each sales floor.

Figure 6:
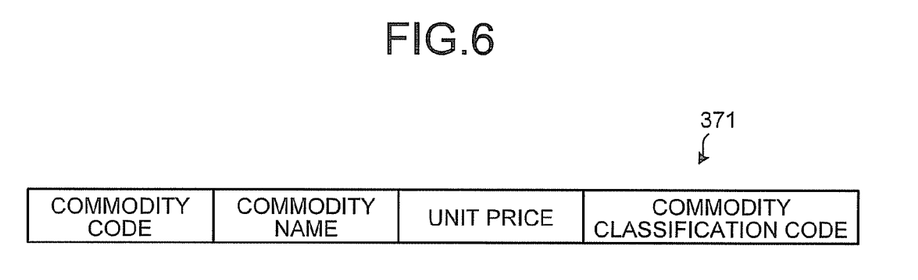
FIG. 6 is a diagram of an example of data items included in a commodity master table.

FIG. 6 is a diagram of an example of data items included in the commodity master table 371. As shown in FIG. 6, the commodity master table 371 includes records including data items such as a commodity code, a commodity name, a unit price, and a commodity classification code. The commodity code is a peculiar code set in advance for each commodity in order to identify various commodity items sold in the store. The commodity name, the unit price, and the commodity classification code are information concerning commodities specified by the same commodity code. For example, the commodity classification code is a code indicating a commodity classification and the like for each sales floor. Therefore, it is possible to check, referring to the commodity classification code, in which sales floor a commodity specified by the commodity code is sold.

Figure 7:
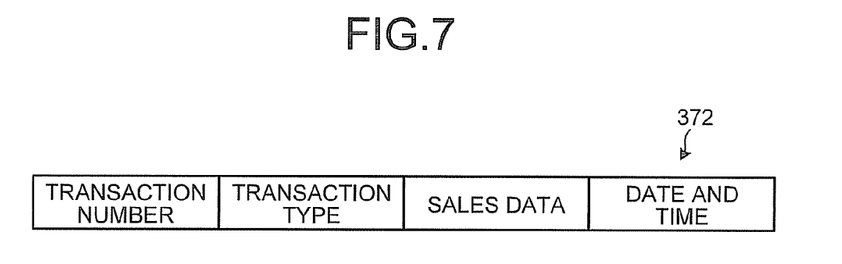
FIG. 7 is a diagram of an example of data items included in a store sales table.

FIG. 7 is a diagram of an example of data items included in the store sales table 372. As shown in FIG. 7, the store sales table 372 includes a record including data items in which a transaction number, a transaction type, sales data, and the like transmitted from the information terminal 102 as the POS terminal in the store during the sales registration processing are stored and a data item in which data and time of registration is stored. The CPU 302 totalizes, on the basis of the data item of the date and time, for each day or each hour, sales data registered in the store sales table 372 according to a request from the information terminal 102 or at predetermined timing (e.g., once a day). The CPU 302 transmits the totalized sales data to a host server apparatus (not shown) set in a head office or the like of the store and to the information terminal 102 that requests the registration. The information terminal 102 may perform the totalizing of sales data in each day or each hour. Specifically, the CPU 302 transmits, according to a request from the information terminal 102, sales data registered in the store sales table 372 to the information terminal 102. Consequently, the information terminal 102 can totalize sales in each day or each hour on the basis of the data item of the date and time.

The sales registration processing performed by the information terminal 102 is explained below. In the sales registration processing, the CPU 202 stores, in the work area of the RAM 205, a commodity code input by the scanner apparatus 103. The CPU 202 stores, in the work area of the RAM 205, a transaction type and the number of sold items input through the touch panel 110. Examples of the transaction type include normal transaction, discount transaction, and card payment.

The CPU 202 acquires a sales price, a commodity name, and the like by searching through the commodity master table 371, which is stored in the store computer 105, on the basis of the information stored in the work area and generates sales data based on the commodity code, the number of sold items, the commodity name, the sales price, and the like. Thereafter, the CPU 202 calculates, every time a commodity is input, a total sales amount of the commodity. The CPU 202 repeats the generation of sales data and the calculation of a total sales amount until operation input for instructing closing of one transaction (e.g., pressing of a cash total key on the touch panel 110) is performed. When the closing of one transaction is instructed, the CPU 202 notifies the store computer 105 of sales data for the one transaction together with a transaction number for identifying the transaction and an input transaction type. The store computer 105 registers the sales data, the transaction number, and the transaction type notified from the information terminal 102 in the store sales table 372.

Figure 8:
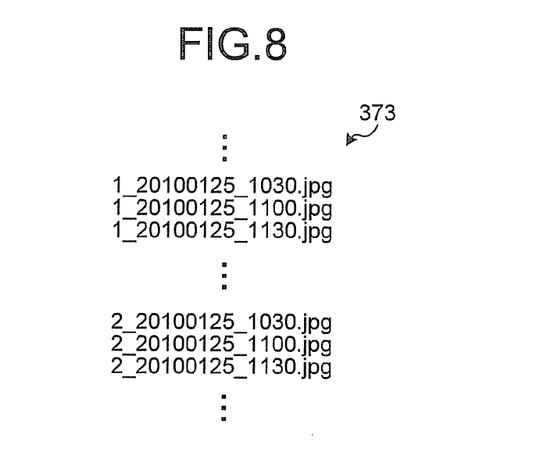
FIG. 8 is a diagram of an example of a data file included in sales floor video data.

The sales floor video data 373 is explained below. FIG. 8 is a diagram of an example of a data file included in the sales floor video data 373. As shown in FIG. 8, the sales floor video data 373 includes, for example, plural still image files of the Joint Photographic Experts Group (JPEG) format. In the sales floor video data 373, videos of each sales floor are recorded as a still image file in each hour in time series. Specifically, a still image obtained by picking up an image of the sales floor is recorded with a file name in which a number at the head is a code indicating the sales floor, a number after the first under bar indicates a date of the image pickup, and a number after the second under bar indicates time of the image pickup. In the case of "1__20100125__1030.jpg" in the example shown in the figure, "1" at the head indicates a sales floor of prepared meal or the like, "20100125" indicates that a still image is picked up on Jan. 25, 2010, and "1030" indicates that the still image is picked up at 10:30. The CPU 302 acquires, at a predetermined time interval (e.g., every 30 minutes), videos distributed from the live cameras 104 set in each sales floor and records the videos in the sales floor video data 373 with the file names attached to the videos. Therefore, it is possible to acquire videos of each sales floor in each hour referring to file names of data files recorded in the sales floor video data 373.

In the example explained in this embodiment, videos of each sales floor in each hour are recorded as still image files. However, concerning time-series recording of videos of each sales floor, the videos may be sequentially recorded as, for example, moving image data of the Moving Picture Experts Group (MPEG) format. Even when the videos of each sales floor are sequentially recorded as the moving image data, it is possible to acquire a still image in each hour by designating a frame position. As explained above, the time-series recording of the videos in each sales floor includes the recording of continuous moving images and the recording of still images intermittently picked up at predetermined time intervals.

An example of the operation of the information terminal 102 realized by being executed by the CPU 202 according to a program stored in the HDD 208 is explained below with reference to a flowchart of FIG. 9. More specifically, a series of operation performed when a display screen for sales floor management is displayed on the liquid crystal display 109 in the sales floor management processing is explained.

Figure 9:
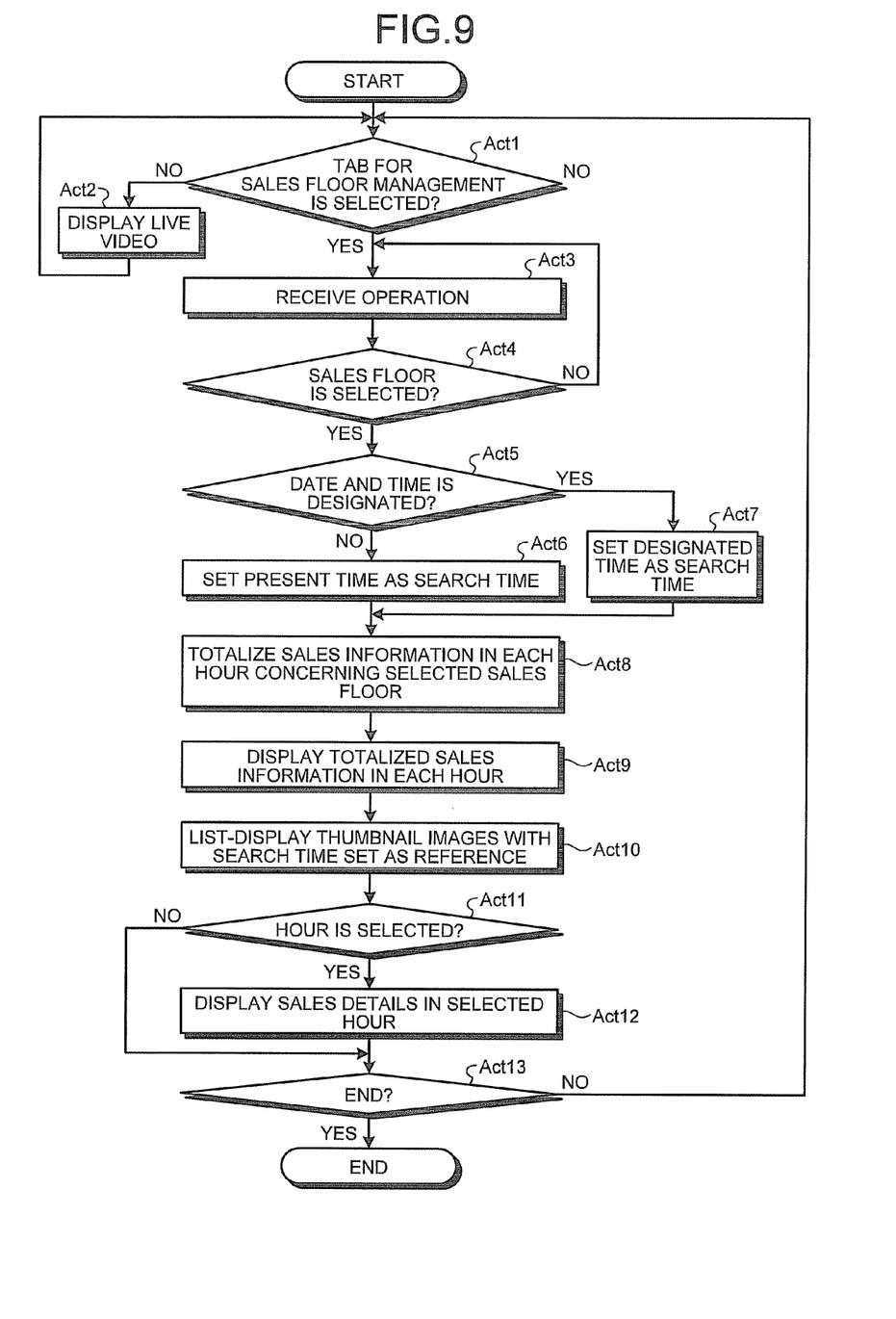
FIG. 9 is a flowchart for explaining an example of the operation of the information terminal.

As shown in FIG. 9, when the processing is started and the display screen for sales floor management is displayed on the liquid crystal display 109, the CPU 202 determines whether a tab of sales floor management on the display screen is selected through the touch panel 110 (Act 1).

Figure 10:
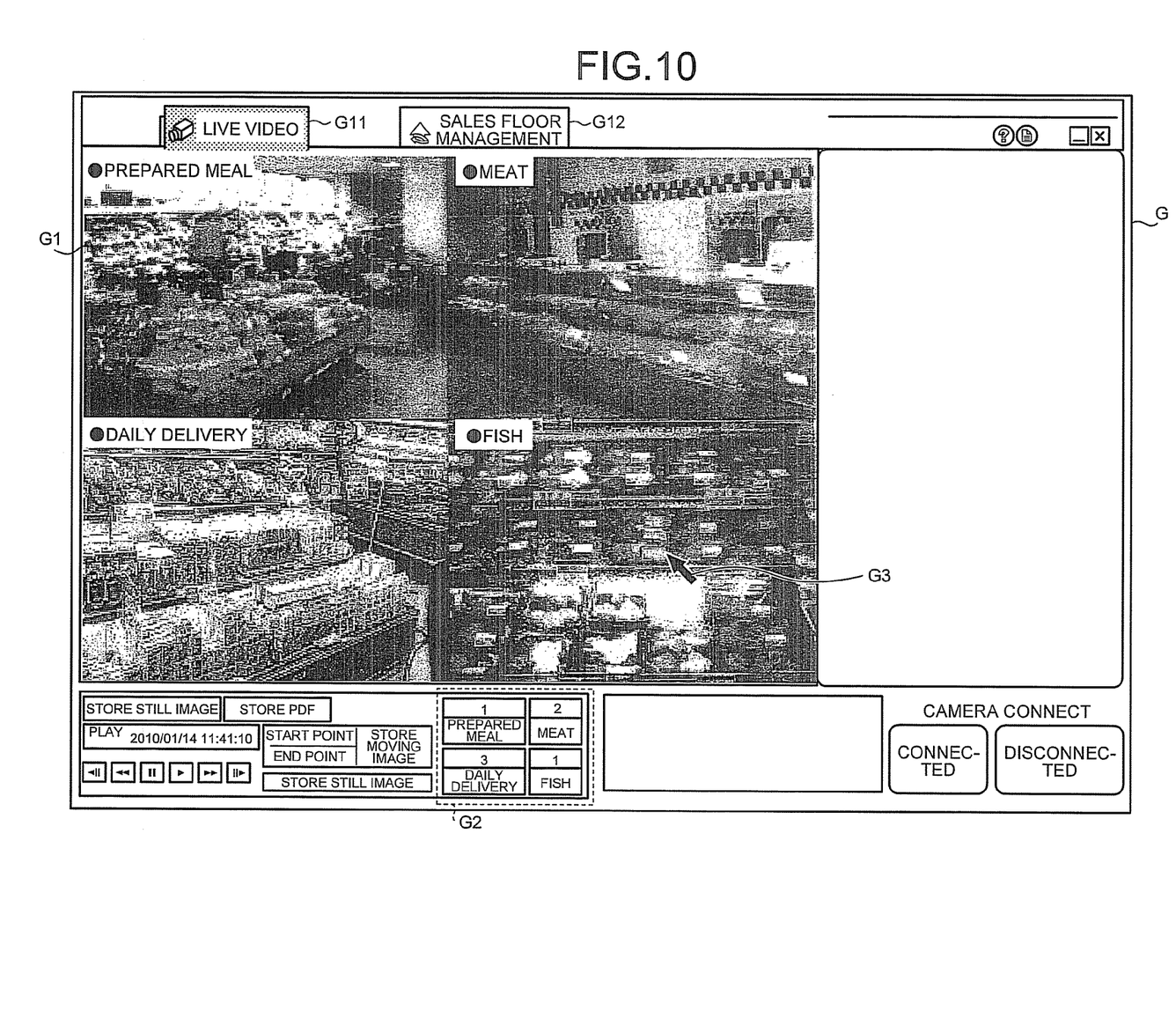
FIG. 10 is a diagram of an example of a display screen.

FIG. 10 is a diagram of an example of a display screen G. The display screen G is the display screen for sales floor management displayed on the liquid crystal display 109 in the sales floor management processing. As shown in FIG. 10, an information window G1, a selection button G2, and a cursor G3 are displayed on the display screen G.

The information window G1 is a window on which tabs G11 and G12 are provided in an upper portion and information corresponding to a tab selected by using the cursor G3 or the like is displayed. The tab G11 is a tab for displaying a live video of a sales floor in the information window G1. The tab G12 is a tab for sales floor management for displaying information concerning the sales floor management in the information window G1. In the example shown in the figure, the tab G11 is selected and live videos of floors (prepared meal, meat, daily delivery, and fish) are displayed in the information window G1. The selection button G2 as sales floor selecting means is an operation button for selecting a sales floor using the cursor G3 or the like. The cursor G3 moves on the display screen G in response to touch operation of the touch panel 110.

Referring back to FIG. 9, if the tab G12 for sales floor management is not selected through the touch panel 110 in Act 1 (No), i.e., if the tab G11 for displaying a live video is selected, the CPU 202 acquires live videos of the sales floors distributed by the live cameras 104 set in each sales floor and displays the live videos in the information window G1 (Act 2). If a sales floor is selected by using the selection button G2, a live video of the selected sales floor may be displayed in the information window G1. After Act 2, the processing is returned to Act 1. Therefore, the display of the live videos is continued while the tab G11 is selected.

If the tab G12 for sales floor management is selected through the touch panel 110 in Act 1 (Yes), the CPU 202 receives operation of the touch panel 110 (Act 3) and determines whether a sales floor is selected by using the selection button G2 (Act 4). If a sales floor is not selected (No in Act 4), the processing is returned to Act 3. The processing is looped until a sales floor is selected.

If a sales floor is selected by using the selection button G2 (Yes in Act 4), the CPU 202 determines whether date and time is designated by operation of the touch panel 110 (Act 5). Date and time may be designated by, for example, operation of number buttons (not shown) on the display screen G through the touch panel 110 or may be designated by, for example, touch operation of a graph (details are explained later) indicating the number of sales in each hour, which is sales information in each hour.

If date and time is not designated (No in Act 5), the CPU 202 sets the present date and time as search time serving as a reference for search (Act 6). If date and time is designated (Yes in Act 5), the CPU 202 sets the designated date and time as search time serving as a reference for search (Act 7).

Subsequently, the CPU 202 as totalizing means totalizes sales information (sales data) in each hour concerning the selected sales floor (Act 8). Specifically, the CPU 202 acquires the store sales table 372 from the store computer 105, extracts sales data concerning the selected sales floor from the commodity classification code included in the sales data of the store sales table 372, and totalizes sales in each day or each hour on the basis of the extracted sales data and the data item of date and time of the store sales table 372.

Figure 11:
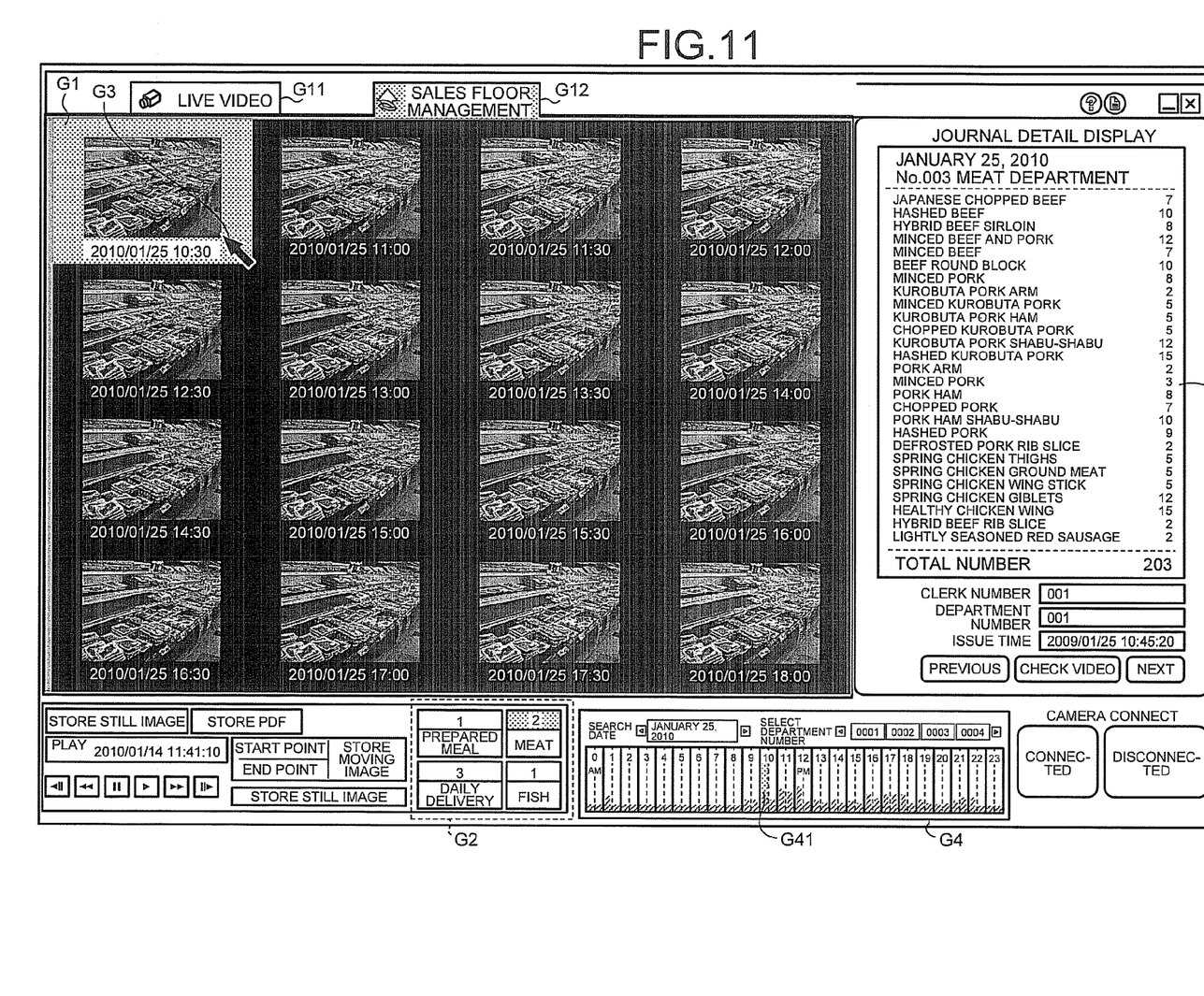
FIG. 11 is a diagram of an example of the display screen.

The CPU 202 as sales display means displays the totalized sales information in each hour on the display screen G (Act 9). FIG. 11 is a diagram of an example of the display screen G. As shown in FIG. 11, the totalized sales information in each hour is displayed in the sales display window G4 of the display screen G as, for example, a graph (e.g., a bar graph) indicating the number of sales in each hour. The sales information in each hour displayed in the sales display window G4 in Act 9 may be sales information in a designated day if date and time is designated and may be sales information in the present day if date and time is not designated. A marker G41 is displayed in an hour corresponding to the set search time in the sales display window G4. This makes it possible to easily check sales information concerning the set search time in the sales information in each hour.

The CPU 202 as list display means list-displays, with the set search time as a reference, a video in each hour of the selected sales floor on the display screen G as a thumbnail image (Act 10). Specifically, the CPU 202 acquires the sales floor video data 373 from the store computer 105. The CPU 202 extracts, with the set search time as a reference, still image files for predetermined time width out of still image files concerning the selected sales floor referring to a file name of a data file recorded in the sales floor video data 373.

As shown in FIG. 11, the CPU 202 list-displays thumbnail images of the extracted still image files in the information window G1 of the display screen G.

In the example shown in the figure, in the information window G1, a thumbnail image at "2010/01/25 10:30", which is the set search time, is arranged in a reference position at the upper left and 4×4 thumbnail images are arranged from the upper left to the lower right. The thumbnail images indicate videos of the sales floor at every thirty minutes. Therefore, the user can check, from the videos, states of display shelves and the like in the sales floor at every thirty minutes from "2010/01/25 10:30" to "2010/01/25 18:00". The display form shown in the figure is only an example. The number of thumbnails to be displayed, an array direction of the thumbnail images, a reference position where a thumbnail image of the sales floor concerning the set search time is displayed, and the like may be changed as appropriate.

As explained above, on the display screen G, the videos in each hour of the selected floor are displayed in the information window G1 and the sales information in each hour of the selected sales floor is displayed in the sales display window G4. Therefore, the user can check not only the sales information in each hour of the sales floor but also a present situation of the sales floor such as a state of display shelves in the sales floor from the videos of the sales floor in each hour.

The sales information in each hour displayed in the sales display window G4 is data of commodities, the price of which is already paid. The thumbnail image list-displayed in the information window G1 is a video of the sales floor in each hour and indicates the present situation of the sales floor.

The information window G1 and the sales display window G4 are displayed on the same display screen G and can be easily compared. Therefore, if the user compares the sales information in each hour displayed in the sales display window G4 and the video of the sales floor in each hour list-displayed in the information window G1, the user can intuitively grasp, for example, flows of customers moving around the store holding commodities of the sales floor without making a payment.

In this way, the user grasps even the flows of customers moving around the store holding commodities of the sales floor without making a payment. Therefore, the user can accurately predict sales in future of commodities and can perform sales management for reducing not only a loss of sales opportunities due to lack of commodities on display shelves but also a loss of commodities that cannot be entirely sold and are discarded.

For example, if an hour of a video of a sales floor when a displayed commodity starts to decrease and an hour when sales of the commodity increase coincide with each other, it is possible to predict that customers who purchase the commodity in the hour have no intension of purchasing commodities other than the commodity and immediately proceed to payment carrying only the commodity. On the other hand, if sales of a displayed commodity increase in an hour later than an hour of a video of a sales floor when the displayed commodity starts to decrease, it is possible to predict that customers who purchase the commodity in the hours have the intension of purchasing other commodities together with the commodity and move around the store. Therefore, it is possible to predict, from a difference between an hour of a video of a sales floor when a displayed commodity decreases and an hour when sales of the commodity in the sales floor increase, a shopping tendency of customers who purchase the commodity in the hours.

The CPU 202 determines whether an hour is selected by operation of the touch panel 110 as hour selecting means (Act 11). For example, as shown in FIG. 11, an hour is selected by selecting a thumbnail image list-displayed in the information window G1 by operating the cursor G3 through the touch panel 110. An hour of the graph displayed in the sales display window G4 may be selected by operating the cursor G3 through the touch panel 110.

If an hour is not selected (No in Act 11), the CPU 202 proceeds the processing to Act 13. If an hour is selected (Yes in Act 11), the CPU 202 displays sales details (e.g., the number of sold items for each commodity item displayed in the sales floor) in the selected hour on the display screen G (Act 12).

Specifically, the CPU 202 extracts sales data registered in the selected hour from the date and time included in the store sales table 372 and extracts sales data concerning the selected sales floor from the commodity classification code included in the sales data of the store sales table 372. The CPU 202 counts the number of sold items for each commodity classification code from the extracted sales data and calculates the number of sold items for each commodity item displayed in the sales floor. As shown in FIG. 11, the CPU 202 displays the calculated number of sold items for each commodity item in a sales detail display window G5 of the display screen G.

This enables the user to check sales details in each hour. The sales details in each hour displayed in the sales detail display window G5 are data of commodities, the price of which is already paid. The thumbnail image list-displayed in the information window G1 is a video of the sales floor in each hour and indicates the present situation of the sales floor. The information window G1 and the sales detail display window G5 are displayed on the same display screen G and can be easily compared. Therefore, if the user compares sales details in a predetermined hour displayed in the sales detail display window G5 and the present situation of the sales floor in each hour list-displayed in the information window G1, the user can grasp in detail, for example, flows of customers moving around the store holding commodities of the sales floor without making a payment.

Subsequently, for example, the CPU 202 determines whether operation for ending the processing is input through the touch panel 110 to determine whether the processing is ended (Act 13). If operation for ending the processing is input through the touch panel 110 (Yes in Act 13), the CPU 202 directly ends the processing. If operation for ending the processing is not input through the touch panel 110 (No in Act 13), the CPU 202 returns the processing to Act 1 and continues the processing. If the CPU 202 returns the processing to Act 1 and continues the processing, since the graph indicating the number of sales in each hour is already displayed in the sales display window G4, it is possible to designate date and time by touching the graph.

The programs executed in the information terminal 102 according to this embodiment are provided while being incorporated in the HDD 208, the ROM 204, and the like in advance. The programs executed in the information terminal 102 according to this embodiment may be provided while being recorded on a computer-readable medium such as a CD-ROM, a flexible disk (FD), a CD-R, or a digital versatile disk (DVD) in a file of an installable format or an executable format.

The programs executed in the information terminal 102 according to this embodiment may be provided by being stored on a computer connected to a network such as the Internet and downloaded through the network. The programs executed in the information terminal 102 according to this embodiment may be provided or distributed through the network such as the Internet.

The programs executed in the information terminal 102 according to this embodiment have a module configuration including the units (means). As actual hardware, the CPU 202 reads out and executes the programs from the ROM 204 and the HDD 208, whereby the units are loaded onto a main storage device (the RAM 205) and the means are generated on the main storage device.

In this embodiment, the processing in the information terminal 102 set on the register table or in the backyard is explained as an example. However, it goes without saying that the processing performed in the information terminal 102 may be performed in the store computer 105 or the host server apparatus set in the head office or the like.

What is claimed is:

1. An information terminal comprising:
    a storing unit configured to store image pickup data picked up in time series by an image pickup apparatus that pickup images of each of a plurality of sales floors and sales data obtained by recording sales of a commodity displayed on the sales floor and date and time of registration of the sales;
    a sales floor selection unit configured to select one of the sales floors;
    a video display unit configured to list-display videos of the selected sales floor in time series at every predetermined time interval on the basis of the image pickup data;
    a totalizing unit configured to totalize, at the every time interval, list-displayed sales of the commodity of the selected sales floor on the basis of the sales data; and
    a display unit configured to display the totalized sales of the commodity at the every time interval as a graph indicating the sales at the every time interval of the commodity of the selected sales floor with the list-displayed videos of the selected sales floor, wherein
    a starting time and an ending time of the time interval at which the video display unit list-displays the videos of the selected sales floor are respectively identical to a starting time and an ending time of the time interval at which the totalizing unit totalizes the list-displayed sales of the commodity of the selected sales floor.

2. The terminal according to claim 1, wherein the list display unit displays the videos of the sales floor to be list-displayed with information indicating date and time relating to the videos given to the videos.

3. The terminal according to claim 2, further comprising a video selecting unit configured to select anyone of the list-displayed videos, wherein
    the totalizing unit totalizes sales of the commodity at the time interval relating to the selected video, and
    the sales display unit displays the totalized sales of the commodity at the time interval.

4. The terminal according to claim 1, wherein the sales display unit list-displays in time series the sales of the commodity totalized at the every time interval.

5. The terminal according to claim 4, further comprising a sales selecting unit configured to select anyone of the sales of the commodity list-displayed at the every time interval in time series, wherein
    the sales display unit displays the selected sales of the commodity at the time interval.

6. A control method for an information terminal including:
    a storing unit configured to store image pickup data picked up in time series by an image pickup apparatus that pickup images of each of a plurality of sales floors and sales data obtained by recording sales of a commodity displayed on the sales floor and date and time of registration of the sales; and a display unit, the method comprising:
- selecting one of the sales floors;
- list-displaying videos of the selected sales floor in time series at every predetermined time interval on the basis of the image pickup data;
- totalizing, at the every time interval, list-displayed sales of the commodity of the selected sales floor on the basis of the sales data; and
- displaying the totalized sales of the commodity at the every time interval as a graph indicating the sales at the every time interval of the commodity of the selected sales floor with the list-displayed videos of the selected sales floor, wherein
- a starting time and an ending time of the time interval at which the displaying list-displays the videos of the selected sales floor are respectively identical to a starting time and an ending time of the time interval at which the totalizing totalizes the list-displayed sales of the commodity of the selected sales floor.

7. The method according to claim 6, wherein the list-displaying includes displaying the videos of the sales floor to be list-displayed with information indicating date and time relating to the videos given to the videos.

8. The method according to claim 7, wherein
- the totalizing includes totalizing sales of the commodity at the time interval relating to anyone of the videos selected by a video selecting unit configured to select any one of the list-displayed videos, and
- the displaying the totalized sales includes displaying the totalized sales of the commodity at the time interval.

9. The method according to claim 6, wherein the displaying the totalized sales includes list-displaying in time series the sales of the commodity totalized at the every time interval.

10. The method according to claim 9, wherein the displaying the totalized sales includes displaying anyone of the sales of the commodity at the time interval selected by a sales selecting unit configured to select anyone of the sales of the commodity list-displayed at the every time interval in time series.

* * * * *